United States Patent [19]

Date et al.

[11] 4,268,147
[45] May 19, 1981

[54] FOCAL PLANE SHUTTER DEVICE

[75] Inventors: Nobuaki Date, Kawasaki; Michio Senuma, Tokyo; Syozo Yoshida, Machida, all of Japan

[73] Assignee: Canon Kabushiki Kaisha, Tokyo, Japan

[21] Appl. No.: 162,324

[22] Filed: Jun. 23, 1980

[30] Foreign Application Priority Data

Jun. 22, 1979 [JP] Japan ................ 54-78950

[51] Int. Cl.³ .............. G03B 15/03; G03B 9/08; G03B 9/40
[52] U.S. Cl. .................... 354/147; 354/246; 354/252
[58] Field of Search ........ 354/234, 235, 245–249, 354/252, 129, 133, 146, 147, 149, 34

[56] References Cited
U.S. PATENT DOCUMENTS

| | | | |
|---|---|---|---|
| 3,974,511 | 8/1976 | Matsumoto | 354/147 |
| 4,023,192 | 5/1977 | Simon et al. | 354/147 |
| 4,024,550 | 5/1977 | Yazaki et al. | 354/147 |
| 4,054,892 | 10/1977 | Nakagawa et al. | 354/252 |
| 4,139,295 | 2/1979 | Matsumoto | 354/246 |

*Primary Examiner*—Donald A. Griffin
*Attorney, Agent, or Firm*—Toren, McGeady and Stanger

[57] ABSTRACT

A focal plane shutter device of the present invention is provided with leading blade braking means arranged near the terminal end of running down movement of the leading blades of the focal plane shutter to stop said leading blades in a standstill position either directly or through a member cooperative with the leading blades, and brake releasing means arranged in the trailing blades of the shutter upon termination of running down movement of the trailing blades to release the above-described leading blade braking means. Another feature is that the member cooperative with the leading blades in the standstill position and the braking member form a synchro-contact for use in flash photography.

5 Claims, 3 Drawing Figures

FOCAL PLANE SHUTTER DEVICE

BACKGROUND OF THE INVENTION

This invention relates to focal plane shutters for cameras, and more particularly to a control device for terminating the running down of the shutter blades.

When controlling the exposure by the use of a focal plane shutter, as the running down of the leading or trailing blades of the shutter is terminated, a bound or irregular motion of the shutter blades is apt to occur, causing not only the production of an unevenness in the exposure, or the like, but also damages of the shutter mechanism. Therefore, a wide variaty of bound preventing devices have so far found their use with the shutter of the type described above, and may be divided to two main classes, one of which is characterized by the braking action of frictional force, and the other by the use of an arresting member arranged to be actuated just before the blades bound. In the former braking device, the braking action operates gradually so that the life-time of the shutter mechanism is hardly shortened. But, since, during the film winding operation, the braking device reacts in a direction opposite to that in which the film winding proceeds, the driving torque tends to increase. Particularly with the electromagnetically operated shutter, as the driving force of running down the shutter blades is relatively weak, it is difficult for such electromagnetic drive source to accomplish the returning movement of the shutter against this braking force, unless the power of the drive source is greatly increased.

The latter device using the arresting member though having an advantage that the shutter can be returned with ease provided that this arresting member is released, will often damage the endurance of the shutter mechanism because the arresting member suddenly stops the shutter blades.

SUMMARY OF THE INVENTION

An object of the present invention is to prevent an accident of bounding of the shutter blades from occurring at the terminal end of running down movement thereof.

Another object is to provide a bound preventing mechanism capable of elongating the life-time of the shutter blades.

Still another object is to provide a focal plane shutter device adapted to operate with the limitation of the driving force to a minimum as in the electromagnetically driven shutter device and capable, despite the simple construction, of preventing the occurrence of a bound.

Other objects are all directed to obtain a novel braking device which has overcome the above described drawbacks of the conventional one.

According to an embodiment of the present invention, an improvement of the braking mechanism by the braking method is combined with an arrangement that the leading blades of the shutter are released from braking engagement by the action of the trailing blades, thereby giving an advantage that there is no possibility of damaging the shutter blades when undergone a bound preventing action and that no increase in the driving torque is called for when the shutter is returned to the initial position.

According to another embodiment of the invention, a fact that the trailing blades while releasing the leading blades from positive engagement with the braking mechanism lose their kinetic energy to be braked is associated with another fact that, in synchronism with the termination of running down movement of the trailing blades, the leading blades start to return to close the exposure aperture, so that even when it happens that the trailing blades bound, it is possible to perfectly prevent a re-exposure or unevenness of the exposure due to the bound.

Further, according to the embodiment of the present invention, the above described braking member and leading shutter blade are made of metal, and the leading shutter blade is electrically earthed to the camera body, while the braking member is electrically insulated from the camera body, thus allowing for this braking member and leading shutter blade to form a synchro-contact for use with a flash device on the camera. Without the provision of a X-contact in the independent form, therefore, the arrangement of the shutter makes it possible upon utilization of itself to set up the X-contact.

DESCRIPTION OF THE PREFERRED EMBODIMENT

Figure 1:
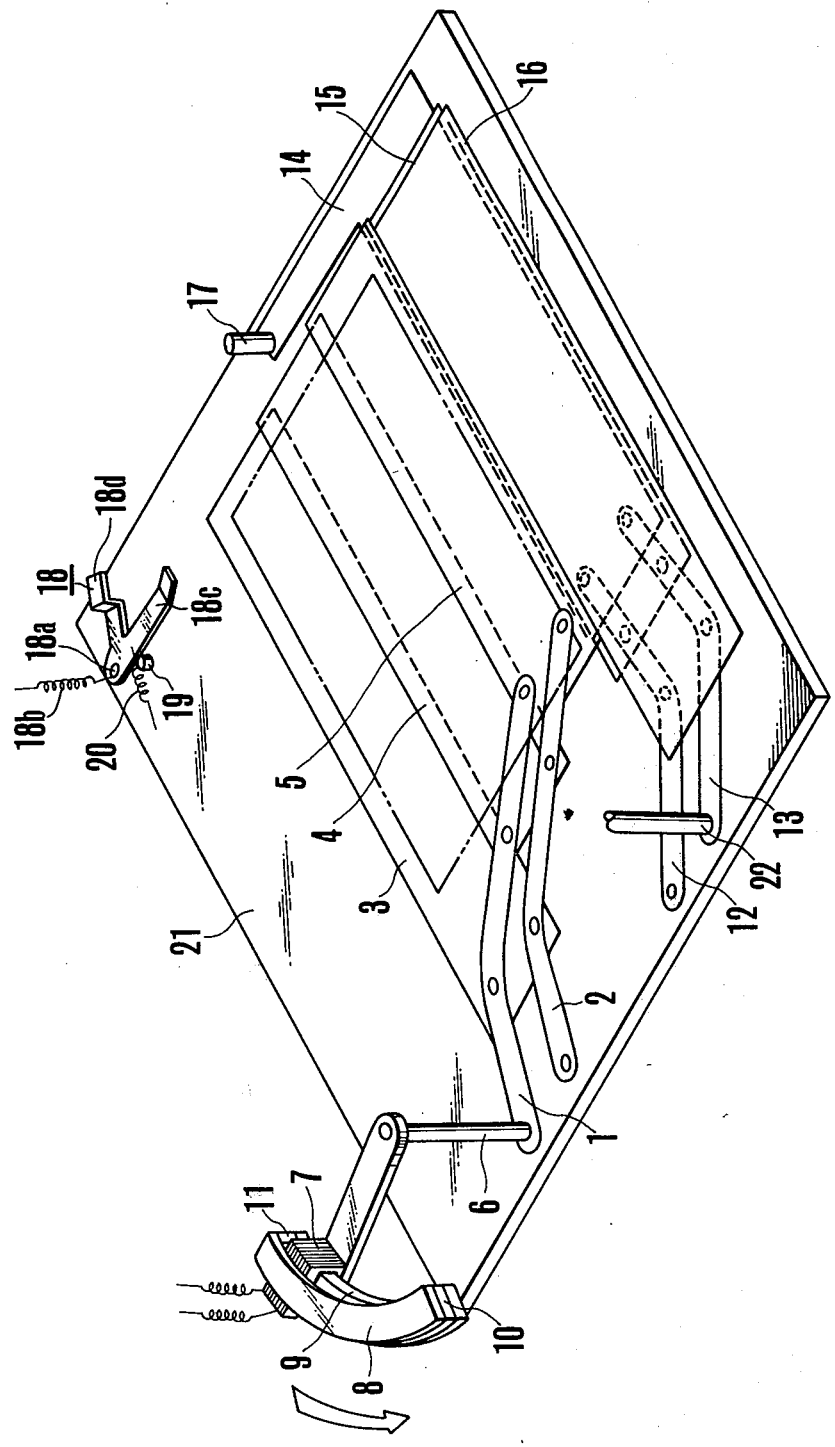
FIG. 1 is a perspective view of one embodiment of a focal plane shutter with a braking device according to the present invention in an initial position ready for making an exposure.
Figure 2:
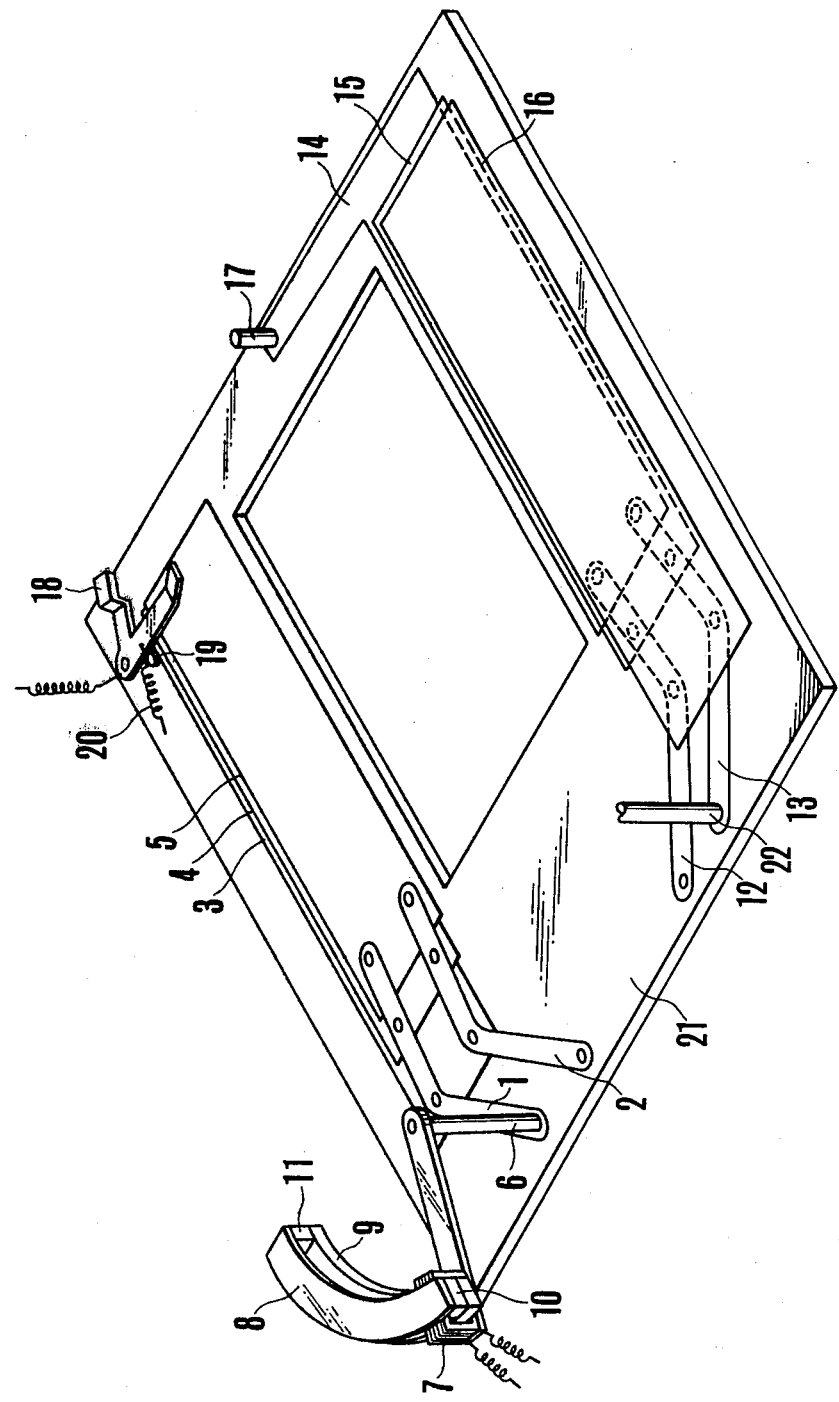
FIG. 2 is a similar view of the shutter in a position where the running down of the leading blades is completed.
Figure 3:
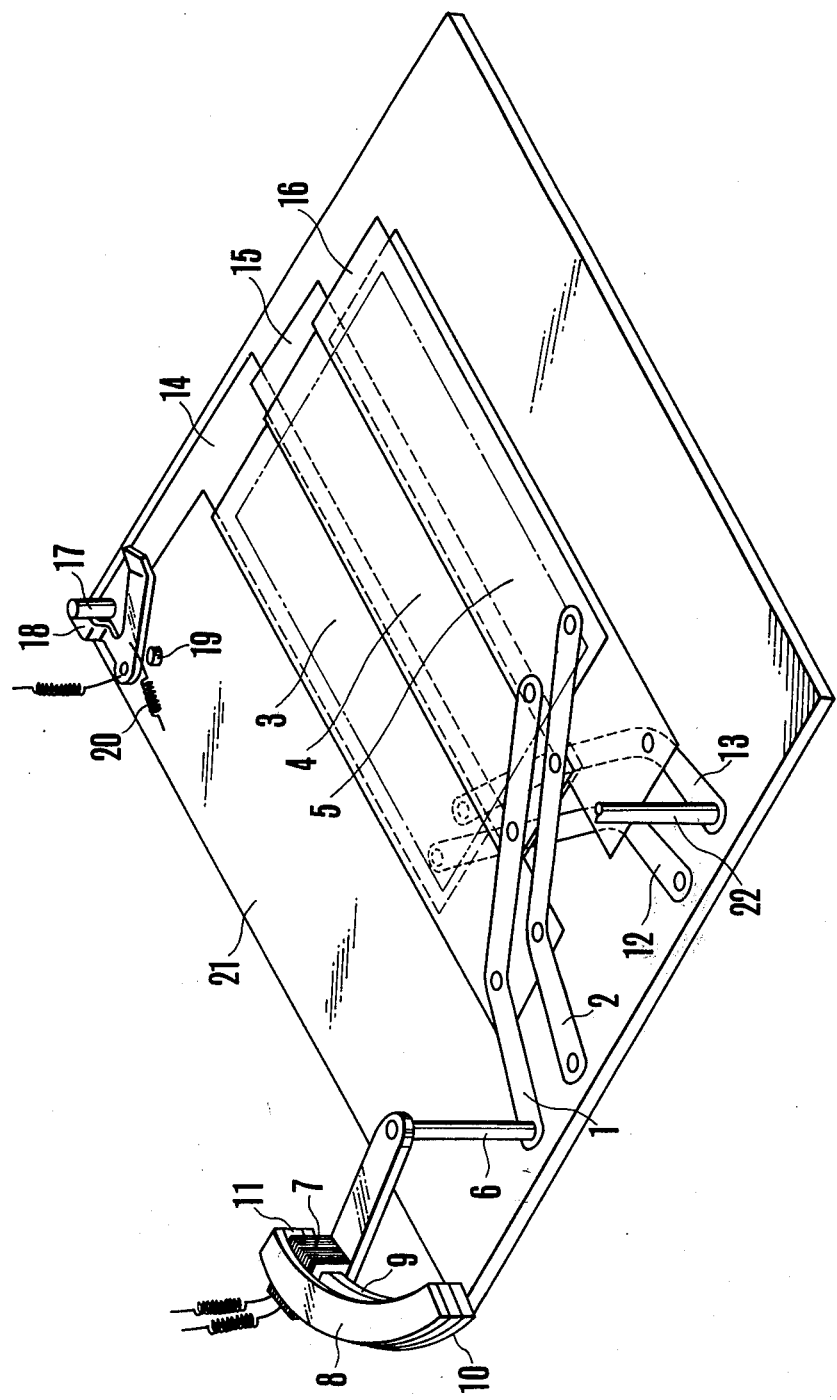
FIG. 3 is a similar view of the shutter in a position where the termination of running down movement of the trailing blades is followed by returning movement of the leading blades to the initial position.

The present invention will next be described in greater detail by reference to the drawings. FIGS. 1, 2 and 3 show an example of construction and arrangement of the braking device of the invention in the three different operative positions when a film gate is closed, opened with the leading blades arrested, and closed again by the trailing blades with the leading blades simultaneously reset to the initial position, respectively. In the drawings, 1 is a drive lever for leading blades 3, 4 and 5 cooperating with a supplementary lever 2 to guide the leading blades when driven to move. A drive shaft 6 is affixed to the drive lever 1 at one end thereof and is rotatably mounted on a ground plate 21. A moving coil 7 constitutes an electromagnetic drive source together with fixed yokes 8 and 9 and permanent magnets 10 and 11 intervening between the yokes 8 and 9 and oriented with their N poles pointing upwards and their S poles pointing downwards so that the ends of the same polarity are in contact with the common yoke, while the moving coil 7 is movably fitted on the yoke 9. In such arrangement, a magnetic field by the permanent magnets 10 and 11 is formed in a space between the yokes 8 and 9. Upon flowing of current through the coil 7 in a direction perpendicular to that of the magnetic flux, therefore, the coil 7 is driven to move in a direction indicated by arrow. It is noted that since the moving coil 7 and the shutter blades are positioned on the opposite side of the blade drive shaft 6 to each other, as their weights are balanced, the driving torque of the shaft 6 is reduced to a minimum. It is further noted that instead of selecting the members 8 and 9 for employment as the yoke and the members 10 and 11 for employment as the permanent magnet, it is of course possible to replace them with each other. In this case, the permanent magnets 8 and 9 must be oriented so that their opposite magnetic poles face at each other.

Trailing blades 14, 15 and 16 are supported and driven by a supplementary lever 12 and a drive lever 13 to move when a drive shaft 22 is rotated by another electromagnetic drive source (not shown). 17 is a brake releasing pin planted on one end of an arm extending from the trailing blade 14. 18 is a braking member pivoted on a shaft 18a to be rotatable relative to the ground plate 21. A spring 20 urges the braking member in a clockwise direction as viewed in the drawings. The clockwise movement of the lever 18 is limited by a stopper 19.

In the connection with the braking member it should be pointed out that a metallic material is employed to make up the member 18, that a potential is applied through lead wires 20, that the member 18 is electrically insulated from the ground plate 21 of metal at which the same potential as on the camera body appears, that the member 18 has a portion 18c acting in a resilient manner in a vertical direction as viewed in the figures, that this portion 18c when in the position of FIG. 1 functions to brake the leading blades 3, 4 and 5 of the shutter, and that another portion 18d of the member 18 extends into the path of movement of the actuator pin 17 so that when the trailing blades nears the terminal end of running down movement, the member 18 is turned counterclockwise by the actuator pin 17 to move away from the leading blades, thus releasing the leading blades from the biased engagement with the braking member.

The operation of the focal plane shutter of FIGS. 1 to 3 is as follows. With the shutter in the position of FIG. 1, when a release is actuated by operating a button (not shown), the moving coil 7 is supplied with current flowing in a direction from the right to the left as viewed in the drawings. As a magnetic flux from the yokes 8 to 9 acts on the current flow, a force of the direction indicated by arrow is exerted in the coil 7, driving the shaft 6 to turn in the counterclockwise direction along with the drive lever 1 through which the leading blades 3, 4 and 5 are moved away from the exposure aperture to initiate an exposure.

Near or at the terminal end of running down movement, the leading blades 3, 4 and 5 are braked while being pressed in the superimposed condition against the ground plate 21 by the member 18 as shown in FIG. 2. If a flash device is in use with the camera, the concurrent contact of an insulated point of the braking member 18 with the metal member on the blade 5 causes the discharge tube to fire, as an actuating signal in the form of a voltage from the lead wires 18b is applied thereto. In a predetermined time interval, the drive shaft 22 is turned counterclockwise by an electromagnetic drive source (not shown) of the construction similar to, for example, that for the leading blades. Such movement of the shaft 22 causes counterclockwise movement of the lever 13 which in turn causes the trailing blades 14, 15 and 16 to move in a direction to close the aperture. Near or at the terminal end of running down movement, the actuator pin 17 strikes the braking member 18 at the arm 18d and then turns the latter in the counterclockwise direction against the force of the spring 20 until the member 18 is taken off from the leading blades, thus performing a release of the brake and the X-contact. At this time, a control circuit (not shown) supplies a reversed current to the coil 7 in the leading blade drive source, thus returning the leading blades to close the aperture again with a small driving torque because of the removal of the braking action therefrom. Therefore, even when the trailing blades bound at the terminal end of movement thereof to open the aperture, as the leading blades already cover the aperture, the film is protected from the re-exposure.

It is noted that in order to initiate the returning of the leading blades of the shutter just after the braking action is taken out of these blades, the control circuit may be constructed with a switch means as arranged to move when the braking member 18 is turned counterclockwise as viewed in the drawings, so that the reversed current flows through the coil 7. Another example is to detect the opening of the X-contact in controlling the change in the direction of current flow through the coil 7. To effect such change, the provision of, for example, a battery is sufficient when the battery is arranged to cooperate with the change-over switch or the like in such a manner that the coil 7 is supplied with current flowing in the reversed direction as the switch is closed.

As soon as the leading blades complete their returning movement as shown in FIG. 3, a returning of the trailing blades follows. In this case, the blades can run up with ease since no braking force is applied thereto.

It will be appreciated that the present invention provides an electromagnetically operated shutter using a braking mechanism in combination with an automatic means rendering it possible to release the leading blades from the braking engagement in response to the termination of running down movement of the trailing blades. An advantage is, therefore, that since the braking load is no longer applied on the leading blades at the start of returning movement thereof, it is made possible to put the braking method into practice with high efficiency even in the electromagnetically operated focal plane shutter where the driving torque available cannot be so much increased. Another advantage is that such braking mechanism arrangement provides for use of itself as part of a synchro-contact for flash photography, thus saving the otherwise necessary synchro-contact of the separate form.

What is claimed is:
1. A focal plane shutter device comprising:
   (a) leading blades arranged to previously block an aperture for photographic light path when in an initial position and upon actuation of a shutter release to move in a first direction away from said aperture;
   (b) trailing blades arranged to previously unblock said aperture when in said initial position and upon termination of a predetermined time interval from the start of movement of said leading blades in said first direction to start movement in said first direction and then to block said aperture;
   (c) braking means arranged at least near the terminal end of movement of said leading blades in said first direction upon engagement with said moving leading blades to brake said leading blades so that said blades get stopped in a predetermined position; and
   (d) brake releasing means consisting of a member cooperative with said trailing blade and arranged to take said braking means out of the braking engagement with said leading blades when said trailing blades near the terminal end of movement thereof in said first direction.

2. A focal plane shutter device according to claim 1, where just after said leading blades have been released from the braking engagement, said blades are driven to move in the reversed direction to said first direction so as to cover said aperture.

3. A focal plane shutter device according to claim 2, wherein as said leading blades have been moved in the reversed direction to said first direction to cover said aperture, said trailing blades also are simultaneously driven to return to said initial position.

4. A focal plane shutter device according to claim 1, wherein said leading blades are made of a light metal, and electrically earthed to a camera body, said braking means is made of a metal and electrically insulated from said camera body, and said leading blades and said braking means form a synchro-contact for use with a flash device.

5. A focal plane shutter device according to claim 1, wherein said leading and/or said trailing blades are driven to move by an electromagnetical force.

* * * * *